(12) United States Patent
Takei et al.

(10) Patent No.: US 12,137,059 B2
(45) Date of Patent: Nov. 5, 2024

(54) L2 SWITCH, COMMUNICATION CONTROL METHOD, AND COMMUNICATION CONTROL PROGRAM

(71) Applicant: Nippon Telegraph and Telephone Corporation, Tokyo (JP)

(72) Inventors: Yuki Takei, Musashino (JP); Masayuki Nishiki, Musashino (JP); Masato Nishiguchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 70 days.

(21) Appl. No.: 18/013,695

(22) PCT Filed: Jul. 1, 2020

(86) PCT No.: PCT/JP2020/025920
§ 371 (c)(1),
(2) Date: Dec. 29, 2022

(87) PCT Pub. No.: WO2022/003882
PCT Pub. Date: Jan. 6, 2022

(65) Prior Publication Data
US 2023/0353509 A1    Nov. 2, 2023

(51) Int. Cl.
*H04L 49/35* (2022.01)
(52) U.S. Cl.
CPC .................. *H04L 49/355* (2013.01)
(58) Field of Classification Search
CPC ...... H04L 45/00; H04L 49/351; H04L 49/355
See application file for complete search history.

(56) References Cited

U.S. PATENT DOCUMENTS

| 6,101,599 | A | * | 8/2000 | Wright | ................... | H04L 49/251 |
| | | | | | | 712/228 |
| 9,237,091 | B2 | * | 1/2016 | Sato | ....................... | H04L 49/351 |
| 9,635,119 | B2 | * | 4/2017 | Izawa | ...................... | H04L 69/22 |
| 2003/0126233 | A1 | * | 7/2003 | Bryers | ....................... | H04L 9/40 |
| | | | | | | 709/219 |
| 2006/0002386 | A1 | * | 1/2006 | Yik | ...................... | H04L 49/3063 |
| | | | | | | 370/469 |
| 2007/0133576 | A1 | | 6/2007 | Tsuge et al. | | |
| 2007/0280258 | A1 | * | 12/2007 | Rajagopalan | ....... | H04L 49/3009 |
| | | | | | | 370/395.3 |
| 2008/0205345 | A1 | * | 8/2008 | Sachs | ................ | H04W 36/0011 |
| | | | | | | 370/332 |
| 2008/0205387 | A1 | * | 8/2008 | Wakumoto | .......... | H04L 49/3009 |
| | | | | | | 370/389 |

(Continued)

FOREIGN PATENT DOCUMENTS

| JP | 3920305 | 2/2007 |
| JP | 2011188433 | 9/2011 |

(Continued)

*Primary Examiner* — Wutchung Chu
(74) *Attorney, Agent, or Firm* — Fish & Richardson P.C.

(57) ABSTRACT

A layer 2 (L2) switch receives session information and destination information included in upstream communication transmitted from a network device, and compresses the received session information and destination information. Then, the L2 switch stores compressed information that has been compressed, into a memory unit that stores a session table to be referred to when downstream communication is received.

6 Claims, 9 Drawing Sheets

(56) References Cited

U.S. PATENT DOCUMENTS

| | | | | |
|---|---|---|---|---|
| 2010/0316053 A1* | 12/2010 | Miyoshi | ............. | H04L 49/3009 370/392 |
| 2011/0219208 A1* | 9/2011 | Asaad | ....................... | G06F 9/06 712/12 |
| 2013/0268643 A1* | 10/2013 | Chang | .................. | G06F 9/5077 709/223 |
| 2014/0237156 A1* | 8/2014 | Regula | ................ | G06F 13/4022 710/314 |
| 2016/0154756 A1* | 6/2016 | Dodson | ............... | G06F 13/4022 710/316 |
| 2019/0089646 A1 | 3/2019 | Yamaura et al. | | |
| 2020/0274792 A1* | 8/2020 | Koshinuma | ............. | H04L 49/15 |
| 2023/0119118 A1* | 4/2023 | Byun | ................. | H04W 36/185 455/442 |

FOREIGN PATENT DOCUMENTS

| | | |
|---|---|---|
| JP | 201957817 | 4/2019 |
| JP | 2019068297 | 4/2019 |

* cited by examiner

L2 SWITCH, COMMUNICATION CONTROL METHOD, AND COMMUNICATION CONTROL PROGRAM

CROSS-REFERENCE TO RELATED APPLICATIONS

This application is a National Stage application under 35 U.S.C. § 371 of International Application No. PCT/JP2020/025920, having an International Filing Date of Jul. 1, 2020, the disclosure of which is considered part of the disclosure of this application, and is incorporated by reference in its entirety into this application.

TECHNICAL FIELD

The present invention relates to an L2 switch, a communication control method, and a communication control program.

BACKGROUND ART

In recent years, against a background of increase in communication volume and the like, each network function (NF) is required to have high performance such as transfer of large-capacity traffic. There is a technology for providing functions such as a load balancer and a firewall by a plurality of NFs in communication via a network, for example, communication between a terminal and a server. In the above technology, in a case where transfer of the large-capacity traffic is performed on the network or the like, a scale-out method of distributing processing to a plurality of NF devices is used. Here, in a case where the NF device provides a function such as the firewall or the like described above, it may be necessary for upstream communication and downstream communication of the communication to pass through the same NF device.

In such a case, a layer 2 (L2) switch is arranged in a subsequent stage of the NF device so that communication in an upstream direction (upstream communication) and communication in a downstream direction (downstream communication) of the communication pass through the same NF device. Then, the L2 switch stores session information and destination information of the received upstream communication. Further, a technology has been proposed in which, when the L2 switch receives downstream communication for the upstream communication, the downstream communication is transferred to the same NF device as the NF device through which the upstream communication has passed, on the basis of the session information and the destination information of the upstream communication (see, for example, Patent Literature 1.).

CITATION LIST

Patent Literature

Patent Literature 1: JP 2019-068297 A

SUMMARY OF INVENTION

Technical Problem

In the conventional technology, there has been a problem that it is not easy to scale out a network to a large capacity in up/down symmetrical communication using the L2 switch. That is, for example, scaling out the NF device increases the number of sessions that can be accommodated on the network. However, it is necessary to store all pieces of header information passing through into the L2 switch in order to ensure symmetry of communication. Therefore, there has been a problem that the number of session tables, that is, the number of scales of the NF device is limited by a hardware area of the L2 switch.

Solution to Problem

In order to solve the above-described problem and achieve the object, an L2 switch of the present invention includes: a reception unit configured to receive a packet of upstream communication and a packet of downstream communication that are transmitted from a network device; a compression unit configured to, when the reception unit receives a packet of upstream communication, acquire session information and destination information included in the packet, and compress the session information and the destination information; and a storing unit configured to store compressed information compressed by the compression unit into a memory unit that stores a session table to be referred to when the packet of the downstream communication is received.

Advantageous Effects of Invention

The present invention facilitates scaling out of a network to a large capacity in up/down symmetrical communication using an L2 switch.

DESCRIPTION OF EMBODIMENTS

Figure 1:
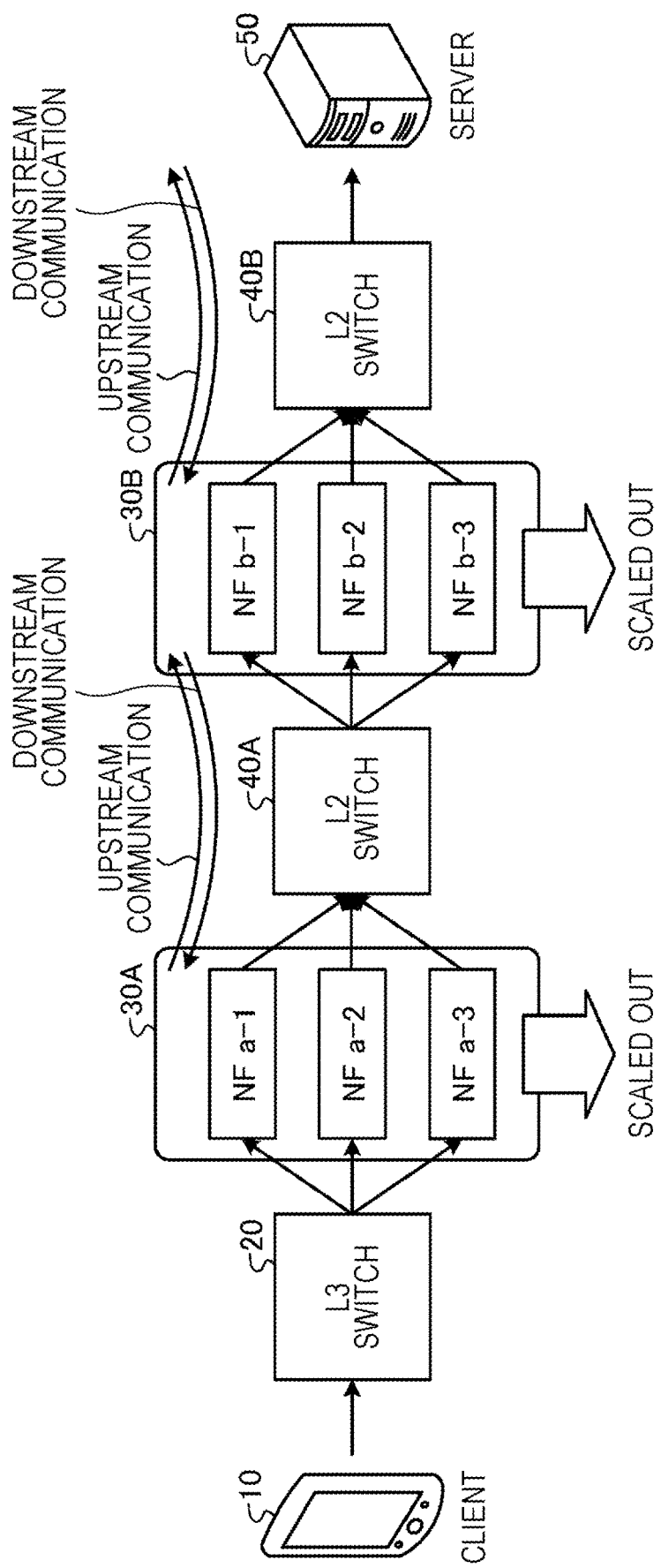
FIG. 1 is a diagram for explaining a basic operation of an L2 switch according to a first embodiment.

Hereinafter, an embodiment of an L2 switch, a communication control method, and a communication control program according to the present embodiment will be described in detail with reference to the drawings. Note that the present invention is not limited to the embodiment described below.

First Embodiment

Hereinafter, an outline of a communication control system, a configuration of an L2 switch, a record compression method, and a record allocation method according to the present embodiment, and a flow of processing in the present embodiment will be described sequentially, and finally, effects of the present embodiment will be described.

[Outline of Communication Control System]

First, an outline of a communication control system according to the present embodiment will be described with reference to FIG. 1. The communication control system includes, for example, a client 10, an L3 switch 20, a plurality of NF devices 30A and 30B, L2 switches 40A and 40B, and a server 50. Note that, in the following description, communication from the client 10 to the server 50 is referred to as upstream communication, and communication from the server 50 to the client 10 is referred to as downstream communication. Hereinafter, in a case where a matter common to individual NF devices is described, they are simply referred to as an NF device 30. Further, when a matter common to individual L2 switches is described, they are simply referred to as an L2 switch 40.

The client 10 is a device that communicates with the server 50, and the L3 switch 20 is a device that performs routing of received upstream communication. For example, first, the L3 switch 20 receives upstream communication transmitted from the client 10. Next, the L3 switch 20 transfers the received upstream communication to any of the NF devices 30 connected the self. Further, the NF device 30 transmits the received upstream communication to the server 50 via the L2 switch 40 connected in the subsequent stage.

Next, a basic operation of the L2 switch of the present embodiment will be described with reference to FIG. 1. The L2 switch 40A is connected to, for example, the plurality of NF devices 30A (NF a-1 to NF a-3) and the plurality of NF devices 30B (NF b-1 to NF b-3), and transfers communication received from any of the NF devices to the next NF device. Here, for example, in a case where the NF device is a device that provides a function of a load balancer or a firewall, it is necessary to pass through the same NF device in upstream communication and downstream communication.

Therefore, when having received downstream communication for upstream communication, the L2 switch 40A performs the following processing in order to transfer the downstream communication to the same NF device as that of the upstream communication. That is, at a time of receiving upstream communication, the L2 switch 40A stores header information (for example, a transmission source MAC address of the NF a-1) indicating a transmission source of the upstream communication, into a memory unit (not illustrated). Thereafter, at a time of receiving downstream communication, the L2 switch 40A refers to the memory unit, and rewrites header information of the downstream communication.

For example, the L2 switch 40A rewrites a destination MAC address in the header information of the downstream communication, to a MAC address of the NF a-1. This causes the downstream communication outputted from the L2 switch 40A to reach the NF device (the NF a-1) same as that of the upstream communication.

Note that, in the example of FIG. 1, the L2 switch 40A is installed between the NF devices, but an installation method is not limited to this. For example, the L2 switch 40A may be installed between the NF device and a device other than the NF device (for example, the server 50).

[Configuration of L2 Switch]

Figure 2:
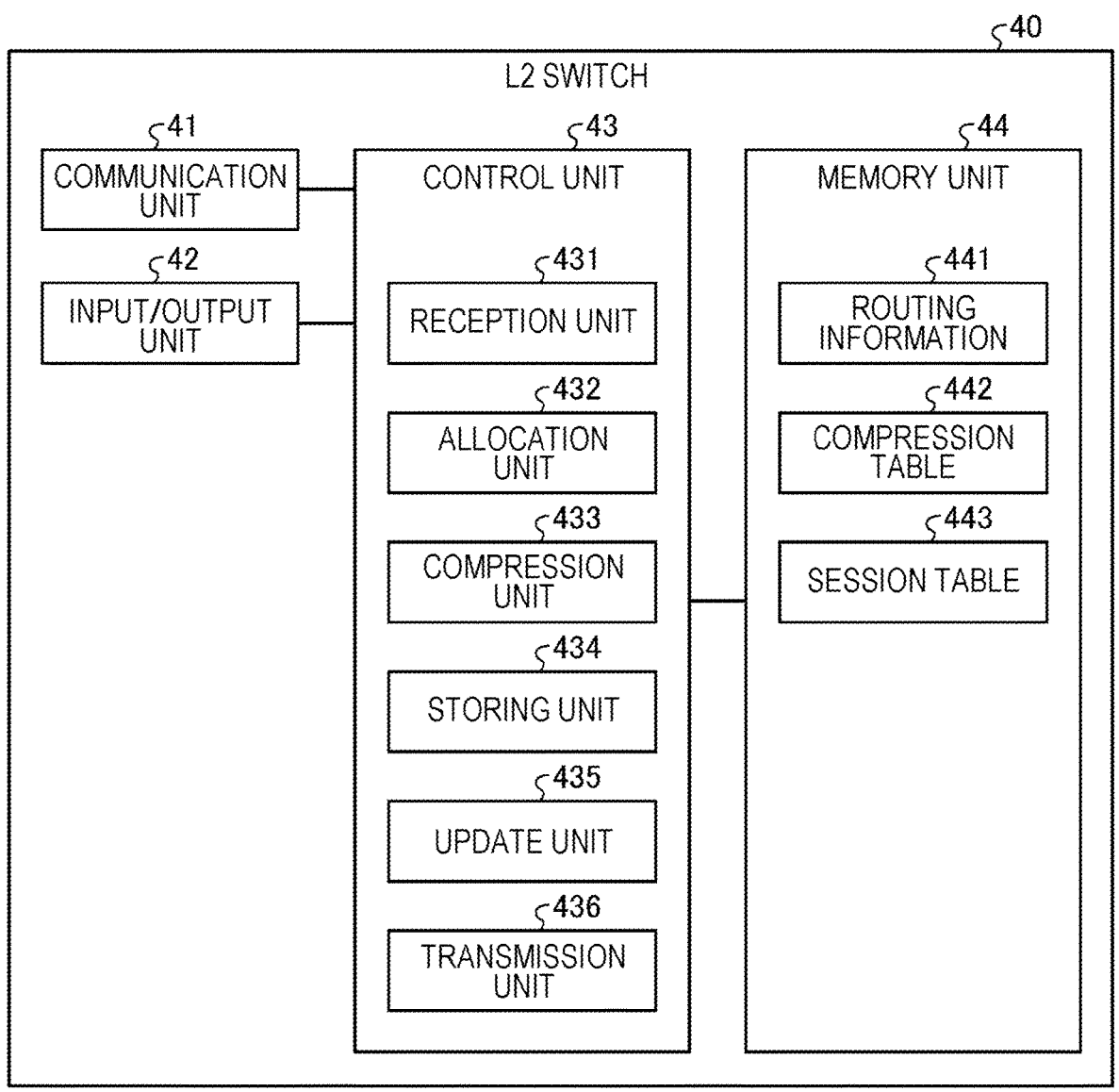
FIG. 2 is a block diagram illustrating a configuration example of the L2 switch according to the first embodiment.

A configuration of the L2 switch 40 will be described in detail with reference to FIG. 2. FIG. 2 is a block diagram illustrating a configuration example of an L2 switch according to the present embodiment. The L2 switch 40 includes a communication unit 41, an input/output unit 42, a control unit 43, and a memory unit 44.

The communication unit 41 is responsible for a communication interface with an external device. The communication unit 41 receives upstream communication via the NF device 30, and transmits upstream communication outputted from the control unit 43 to the server 50, for example. The input/output unit 42 is responsible for input/output of various types of information to/from the L2 switch 40. The input/output unit 42 receives, for example, an input of setting information or the like to the L2 switch 40.

The control unit 43 is responsible for control of the entire L2 switch 40. The control unit 43 includes a reception unit 431, an allocation unit 432, a compression unit 433, a storing unit 434, an update unit 435, and a transmission unit 436. Here, the control unit 43 is, for example, an electronic circuit such as a central processing unit (CPU) or a micro processing unit (MPU), or an integrated circuit such as an application specific integrated circuit (ASIC) or a field programmable gate array (FPGA).

The reception unit 431 receives a packet of upstream communication and a packet of downstream communication that are transmitted from a network device. Here, upstream communication addressed to the server 50 and received by the reception unit 431 is processed by the allocation unit 432, the compression unit 433, and the storing unit 434. Further, downstream communication from the server 50 received by the reception unit 431 is processed by the update unit 435.

The allocation unit 432 determines a storage area for storage of compressed information compressed by the compression unit 433, in accordance with a predetermined allocation method. A detailed description of the processing of the allocation unit 432 will be described later as a record allocation method.

When a packet of upstream communication is received by the reception unit 431, the compression unit 433 acquires session information and destination information included in the packet of the upstream communication received by the reception unit 431, and compresses the received session information and destination information. A detailed description of the compression unit 433 will be described later as a record compression method. Here, the session information is information related to a session and included in upstream communication, and is, for example, 5-tuple information (a transmission source IP address, a destination IP address, a transmission source port number, a destination port number, and a protocol number) or the like. Further, the destination information is information specifying a destination of downstream communication and included in upstream communication, and is, for example, transmission source MAC address information in the upstream communication.

The storing unit 434 stores compressed information compressed by the compression unit 433, into the memory unit 44 that stores a session table to be referred to when the reception unit 431 receives a packet of downstream communication. In addition, the storing unit 434 stores the compressed information compressed by the compression unit 433 into a storage area determined by the allocation unit 432. For example, as the session information and the destination information of the upstream communication, the storing unit 434 stores, in the memory unit 44, a transmission source IP address, a transmission source port number, a protocol number, and a transmission source MAC address of the upstream communication compressed by the compression unit 433. In addition, the storing unit 434 stores compressed information corresponding to a determined memory address in accordance with a record compression method to be described later.

When the reception unit 431 receives a packet of downstream communication, the update unit 435 acquires destination information included in the packet of the upstream communication from the memory unit 44 by using session information included in the received packet, and updates information specifying a destination of the packet of the downstream communication to the acquired destination information.

For example, in downstream communication, the update unit 435 specifies a corresponding record in a session table 443 of the memory unit 44 in which compressed information of upstream communication is stored, on the basis of the session information such as 5-tuple information and the like of the downstream communication. In addition, the update unit 435 acquires a compression number from the specified corresponding record of the session table 443 of the memory unit 44, searches a compression table 442 with the acquired compression number, and acquires a transmission source MAC address in the upstream communication. Then, the update unit 435 updates the destination MAC address of the downstream communication to the transmission source MAC address of the upstream communication. Furthermore, the update unit 435 can update the MAC address by using, for example, an API called netfilter included in Linux (registered trademark) kernel, a similar library called libnetfilter_queue, or the like.

In addition, the transmission unit 436 transmits a packet of upstream communication and a packet of downstream communication received by the reception unit 431 from the network device.

The memory unit 44 stores various types of information to be referred to when the control unit 43 operates. The memory unit 44 has, for example, an area for storage of routing information 441, the compression table 442, and the session table 443. Here, the memory unit 44 is, for example, a semiconductor memory element such as a RAM or a flash memory, or a memory device such as a hard disk or an optical disk. Note that, in the example of FIG. 2, the memory unit 44 is installed inside the L2 switch 40, but may be installed outside the L2 switch 40. Furthermore, a plurality of memory units subjected to scaling out may be installed.

The routing information 441 is information for the L2 switch to perform routing. The routing information 441 is, for example, a routing table in which a port number and a MAC address are associated.

The compression table 442 stores a compression number for compression of session information and destination information. The compression table 442 is set in advance at a time of network design, but can also newly store information such as a compression number in a case where there is no information such as a compression number in the compression table. Here, the compression number is, for example, a code used to compress information, such as a MAC compression code (MC) and a dst compression code (DC). The MC is, for example, an identification number, an identification code, or the like associated with a transmission source MAC address of each connected NF. In addition, the DC is, for example, an identification number, an identification code, or the like associated with a set of a destination IP address, a destination port number, and a protocol number of each connected destination.

The session table 443 stores a compressed record. Here, the compressed record is, for example, session information, destination information, and the like that are replaced with a compression number stored in the compression table 442.

[Record Compression Method]

Figure 3:
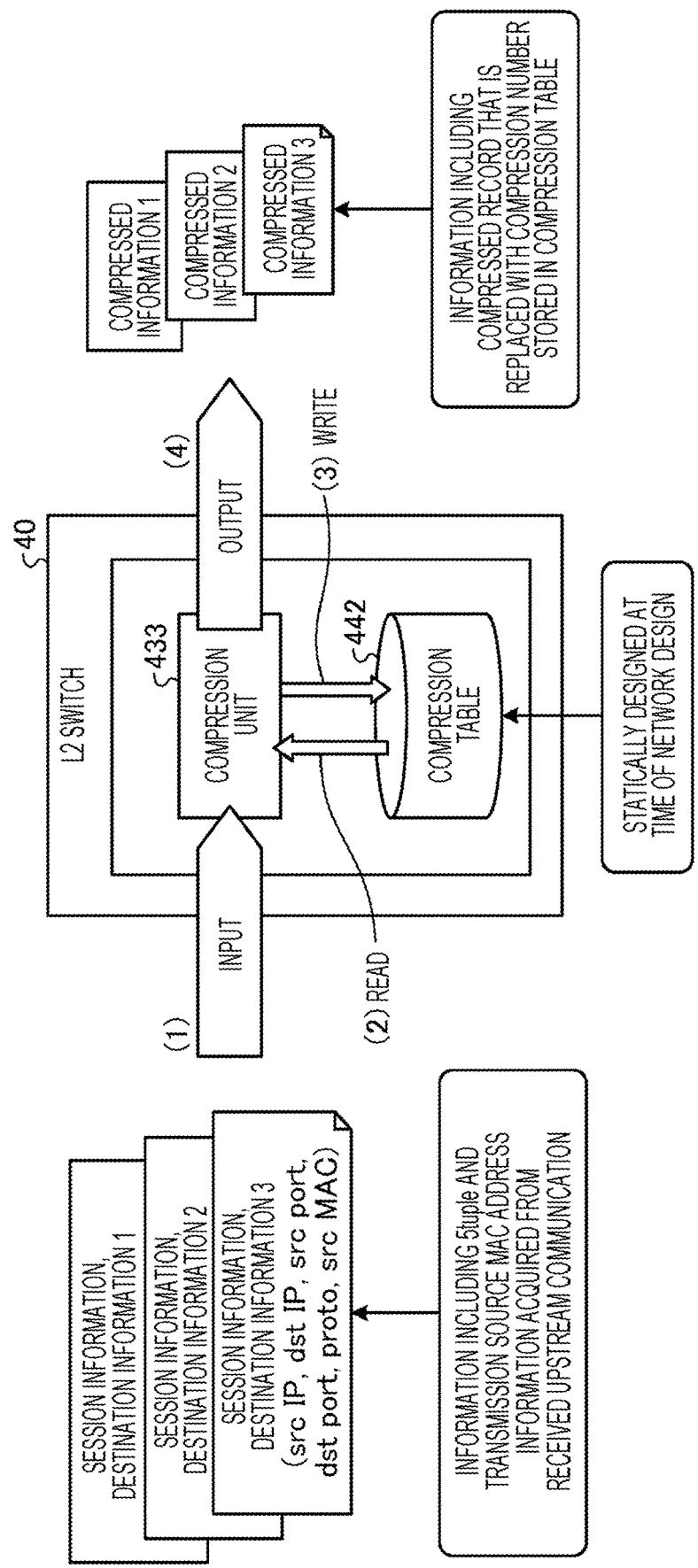
FIG. 3 is a diagram illustrating an outline of a compression method of the L2 switch according to the first embodiment.

A record compression method will be described in detail with reference to FIG. 3. FIG. 3 is a diagram illustrating an outline of a compression method of the L2 switch according to the present embodiment. First, the reception unit 431 receives session information and destination information included in upstream communication transmitted from a network device. The reception unit 431 receives, for example, 5-tuple information, transmission source MAC address information, and the like via the communication unit 41, and inputs to the compression unit 433 (see (1) in FIG. 3).

Next, the compression unit 433 compresses the session information and the destination information received by the reception unit 431. Specifically, the compression unit 433 reads the compression table 442, and searches for the received session information and destination information (see (2) in FIG. 3). As a result, when the received session information and destination information match stored session information and destination information, compression processing is performed, and compressed information is outputted (see (4) in FIG. 3). Here, the compressed information is information including a compressed record, and is stored from the compression unit 433 to the session table 443 via the storing unit 434.

For example, when the 5-tuple information and the transmission source MAC address information received by the reception unit 431 match 5-tuple information and transmission source MAC address information that are stored in the compression table 442, the received 5-tuple information and transmission source MAC address information are compressed by using a compression number associated with the 5-tuple information and the transmission source MAC address information stored in the compression table 442. Note that, a specific example of the compression method using the compression number will be described later with reference to FIGS. 4 and 5.

Furthermore, the compression unit 433 reads the compression table 442, and searches for the received session information and destination information (see (2) in FIG. 3). As a result, when the received session information and destination information do not match stored session information and destination information, the received session information and destination information are written as new information into the compression table 442 (see (3) in FIG. 3). When new information is written, information associated with the session information and the destination information is also written at the same time.

For example, when the 5-tuple information and the transmission source MAC address information received by the reception unit 431 do not match 442 stored in the compression table 442, the 5-tuple information and the transmission source MAC address information received by the reception unit 431 are written together with the corresponding compression number into the compression table 442.

In the L2 switch according to the present embodiment described above, the L2 switch 40 receives session information and destination information included in upstream communication transmitted from the network device, and compresses the received session information and destination information. Then, the L2 switch 40 stores compressed information that has been compressed, into the memory unit 44 that stores a session table to be referred to when downstream communication is received. Therefore, it is possible to facilitate scaling out of a network to a large capacity in up/down symmetrical communication using the L2 switch.

Figure 4:
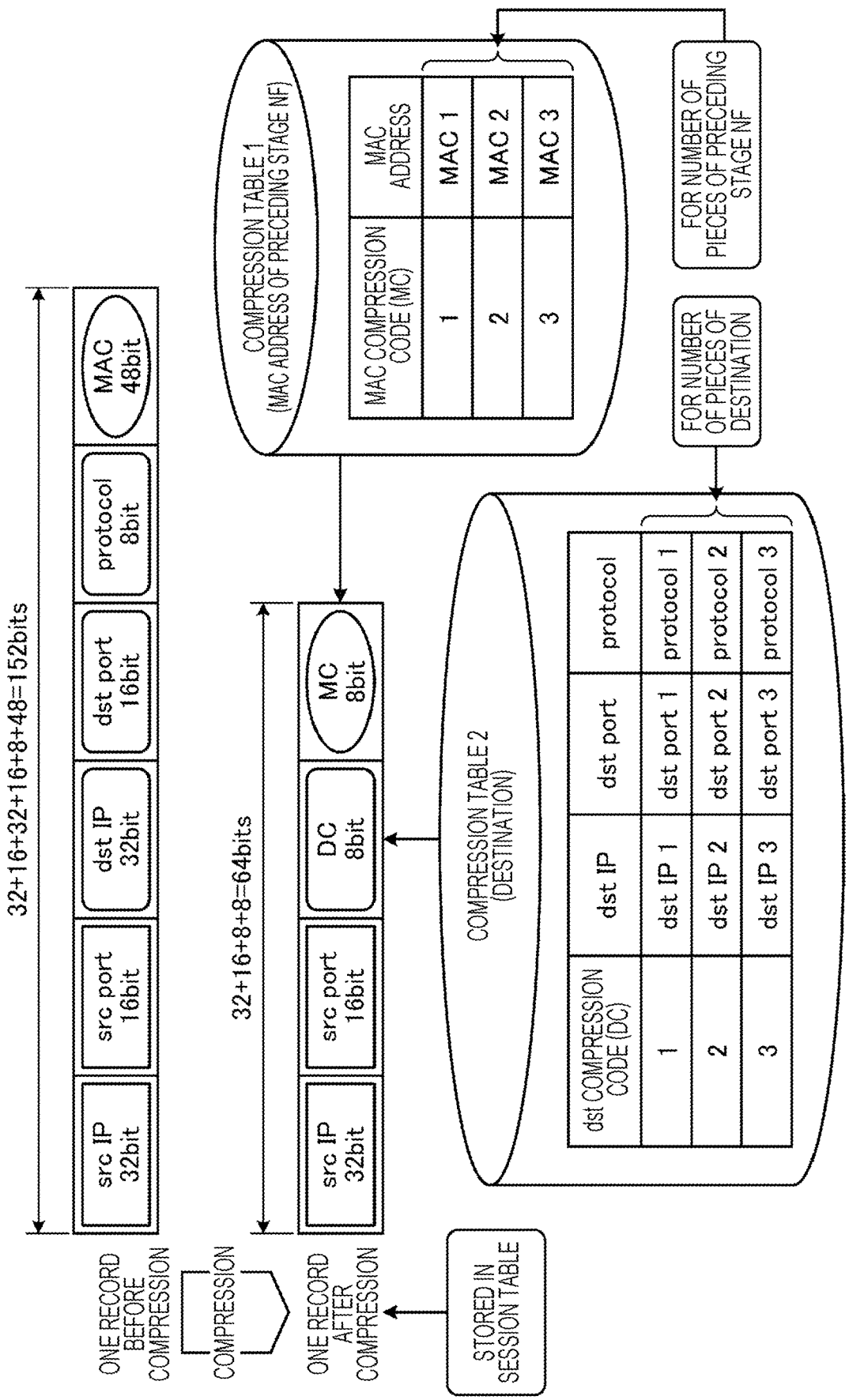
FIG. 4 is a diagram illustrating an example of a compression method of the L2 switch according to the first embodiment.
Figure 5:
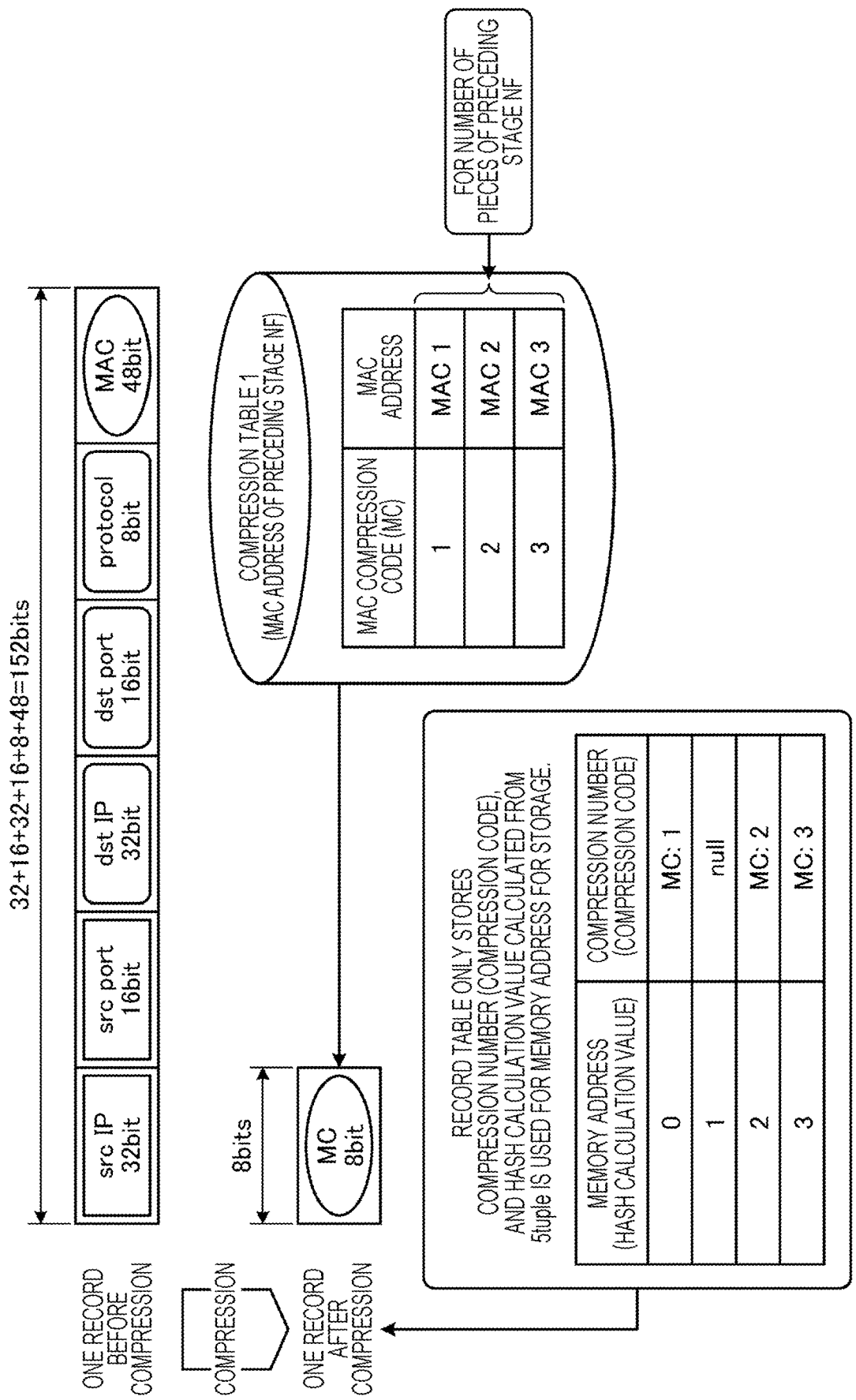
FIG. 5 is a diagram illustrating an example of a compression method of the L2 switch according to the first embodiment.

A specific example of a compression method of session information and destination information by the compression unit 433 will be described with reference to FIGS. 4 and 5. FIGS. 4 and 5 are diagrams illustrating an example of a compression method of the L2 switch according to the present embodiment. In FIG. 4, the compression unit 433 uses two compression tables 442 to perform conversion into a compression code having a record length of 8 bits in each compression table.

First, a record before compression is a transmission source IP address (src IP) 32 bits, a transmission source port number (src port) 16 bits, a destination IP address (dst IP) 32 bits, a destination port number (dst port) 16 bits, a protocol number (proto) 8 bits, and transmission source MAC address information (MAC) 48 bits, and has a record length of 152 bits in total.

A compression table 1 of FIG. 4 stores a MAC compression code (MC) associated with a MAC address of the NF device 30 connected to the L2 switch 40 in a preceding stage. Transmission source MAC address information is replaced with an 8-bit MC by the compression unit 433.

A compression table 2 of FIG. 4 stores a dst compression code (DC) associated with information regarding a destination of upstream communication, such as the server 50. For example, a DC associated with a set of a destination IP address (dst IP), a destination port number (dst port), and a protocol number (proto) is stored. The information regarding the destination is replaced with an 8-bit DC by the compression unit 433. The record after compression is stored in the session table 443 of the memory unit 44 by the storing unit 434.

In the specific example of the first compression method described above, the record after compression is a transmission source IP address (src IP) 32 bits, a transmission source port number (src port) 16 bits, DC 8 bits, and MC 8 bits, and has a record length of 64 bits in total. That is, in the specific example of the first compression method described above, it is possible to compress the record length of one record from 152 bits to 64 bits.

Next, in the example of FIG. 5, the compression unit 433 uses one compression table 442 to perform conversion into a compression code having a record length of 8 bits. First, a record before compression is a transmission source IP address (src IP) 32 bits, a transmission source port number (src port) 16 bits, a destination IP address (dst IP) 32 bits, a destination port number (dst port) 16 bits, a protocol number (proto) 8 bits, and transmission source MAC address information (MAC) 48 bits, and has a record length of 152 bits in total.

A compression table 1 of FIG. 5 stores a MAC compression code (MC) associated with a MAC address of the NF device connected to the L2 switch in a preceding stage. Transmission source MAC address information is replaced with an 8-bit MC by the compression unit 433. Next, the MC, which is a record after compression, is stored in the session table 443 of the memory unit 44 by the storing unit 434.

The compression unit 433 performs hash calculation by using 5-tuple information (a transmission source IP address, a destination IP address, a transmission source port number, a destination port number, and a protocol number). The storing unit 434 uses the hash value as a memory address to store the record after compression. Therefore, in downstream communication, it is possible to refer to the 5-tuple information with the memory address by comparing the hash value.

In the specific example of the second compression method described above, the record after compression has a record length of MC 8 bits. That is, in the specific example of the second compression method described above, it is possible to compress the record length of one record from 152 bits to 8 bits.

[Record Allocation Method]

Figure 6:
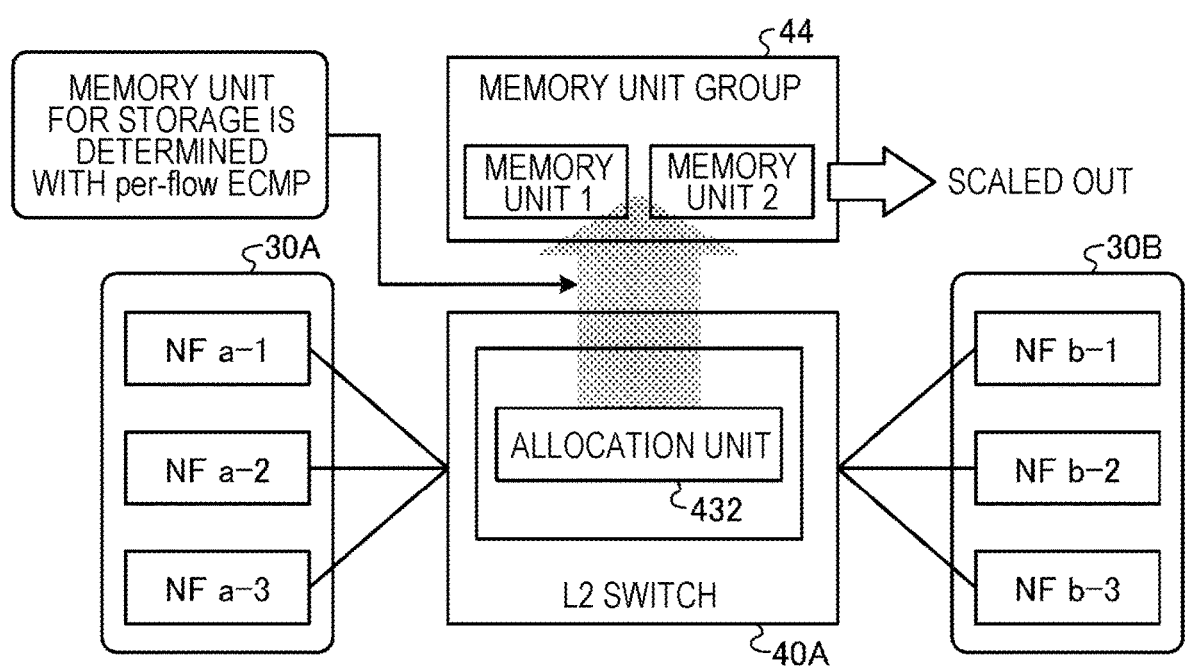
FIG. 6 is a diagram illustrating an outline of an allocation method of the L2 switch according to the first embodiment.

A record allocation method will be described in detail with reference to FIG. 6. FIG. 6 is a diagram illustrating an outline of an allocation method of the L2 switch according to the present embodiment. First, when having received a packet of upstream communication, the reception unit 431 acquires session information and destination information included in the received packet of the upstream communication. The compression unit 433 compresses the session information and the destination information included in the received packet of the upstream communication. Next, the allocation unit 432 determines a storage area for storage of compressed information compressed by the compression unit 433, in accordance with a predetermined allocation method. Moreover, the storing unit 434 stores the compressed information compressed by the compression unit 433 into the storage area determined by the allocation unit 432.

For example, the reception unit 431 acquires 5-tuple information and transmission source MAC address information included in the packet of the upstream communication via the communication unit 41. The compression unit 433 compresses the 5-tuple information and the transmission source MAC address information received by the reception unit 431 in accordance with a preset compression method.

Next, the allocation unit 432 determines a storage area for storage of the compressed information compressed by the compression unit 433. For example, the allocation unit 432 performs hash calculation by using the 5-tuple information, and determines a memory unit for storage of the compressed 5-tuple information and transmission source MAC address information by a per-flow equal cost multi path (ECMP) based on the hash value. Then, the storing unit 434 stores the compressed 5-tuple information and transmission source MAC address information into a session table of the memory unit determined by the allocation unit 432.

In the L2 switch according to the present embodiment described above, the L2 switch 40 determines the storage area for storage of the compressed information compressed by the compression unit 433, in accordance with a predetermined allocation method. Then, the compressed information that has been compressed is stored in the determined storage area. Therefore, it is possible to facilitate scaling out of the memory unit 44, and further, it is possible to facilitate scaling out of a network to a large capacity in up/down symmetrical communication using the L2 switch.

[Processing Procedure of Upstream Communication]

Figure 7:
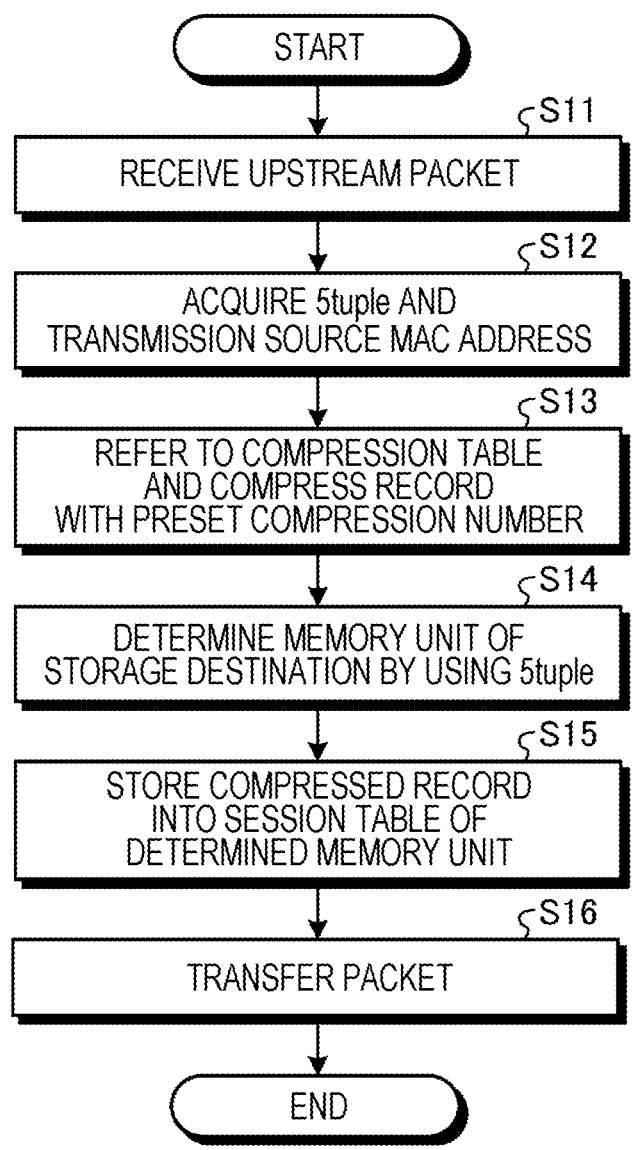
FIG. 7 is a flowchart illustrating an example of a processing procedure at a time of upstream communication of the L2 switch according to the first embodiment.

An example of a processing procedure in upstream communication according to the present embodiment will be described with reference to FIG. 7. FIG. 7 is a flowchart illustrating an example of a processing procedure at a time of upstream communication of the L2 switch according to the present embodiment. First, as illustrated in FIG. 7, the reception unit 431 of the L2 switch 40 receives a packet of upstream communication (step S11), and acquires 5-tuple information included in the upstream communication via the communication unit 41 (step S12).

Next, the compression unit 433 refers to the compression table 442 of the memory unit 44, compresses the 5-tuple information and the transmission source MAC address information with a compression number corresponding to a preset compression method, and outputs the compressed information including the compressed record (step S13). Note that the compression number may be stored in advance in the compression table 442, or may be stored after the packet of the upstream communication is inputted.

Furthermore, the allocation unit 432 performs hash calculation on the 5-tuple information received by the reception unit 431, and determines a storage area of a memory unit for storage of the compressed record outputted from the compression unit 433 with per-flow ECMP using the hash value (step S14). Note that the storage area determination processing may be performed simultaneously with the compression processing of the 5-tuple information and the transmission source MAC address information, or may be performed before the compression processing.

Subsequently, the storing unit 434 stores the compressed information outputted from the compression unit 433 into the session table 443 of the memory unit 44 determined by the allocation unit 432 (step S15). At this time, when the compressed information includes information such as a memory address of the session table, the storing unit 434 stores the compressed information in accordance with the information.

Finally, the transmission unit 436 refers to the routing information 441 in the memory unit 44, and transfers the packet of the upstream communication via the communication unit 41 (step S16).

[Processing Procedure of Downstream Communication]

Figure 8:
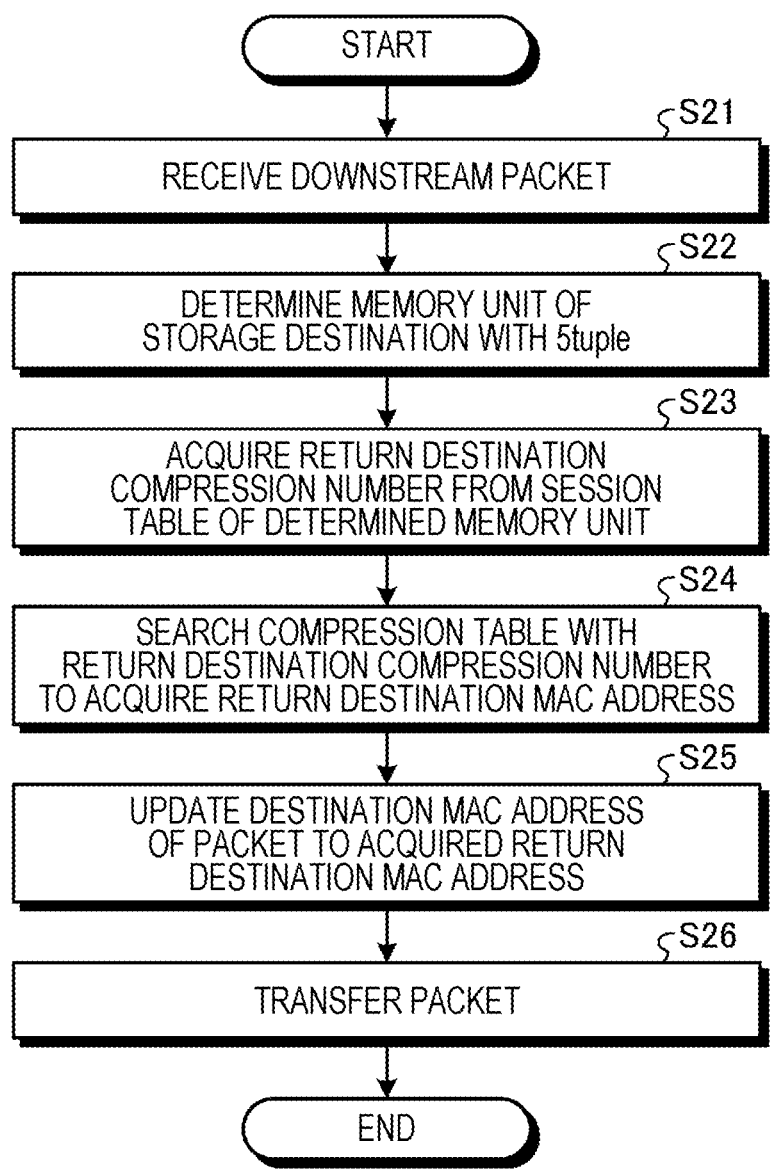
FIG. 8 is a flowchart illustrating an example of a processing procedure at a time of downstream communication of the L2 switch according to the first embodiment.

An example of a processing procedure in downstream communication according to the present embodiment will be described with reference to FIG. 8. FIG. 8 is a flowchart illustrating an example of a processing procedure at a time of downstream communication according to the present embodiment. First, as illustrated in FIG. 8, the reception unit 431 of the L2 switch 40 receives a packet of downstream communication (step S21). Next, on the basis of the 5-tuple information received by the reception unit 431 via the communication unit 41, the update unit 435 specifies the session table 443 of the memory unit 44 in which the compressed information of the upstream communication is stored (step S22).

Further, the update unit 435 acquires a return destination compression number from the specified session table 443 of the memory unit 44 (step S23), and searches the compression table 442 with the acquired return destination compression number, to acquire a return destination MAC address (step S24). Further, the update unit 435 updates the destination MAC address of the packet of the downstream communication to the acquired return destination MAC address (step S25). Finally, the transmission unit 436 refers to the routing information 441 in the memory unit 44, and transfers the packet of the downstream communication via the communication unit 41 (step S26).

Effects of First Embodiment

In the L2 switch according to the present embodiment described above, the L2 switch 40 receives session information and destination information included in upstream communication transmitted from the network device, and compresses the received session information and destination information. Then, the L2 switch 40 stores compressed information that has been compressed, into the memory unit 44 that stores a session table to be referred to when downstream communication is received. Therefore, it is possible to facilitate scaling out of a network to a large capacity in up/down symmetrical communication using the L2 switch.

Furthermore, in the L2 switch according to the present embodiment described above, the L2 switch 40 further determines a storage area for storage of compressed information that has been compressed, in accordance with a predetermined allocation method. Then, the compressed information that has been compressed is stored in the determined storage area. Therefore, it is possible to facilitate scaling out of the memory unit 44, and further, it is possible to facilitate scaling out of a network to a large capacity in up/down symmetrical communication using the L2 switch.

[System Configuration and Other]

Each component of each device that has been illustrated according to the embodiment described above is functionally conceptual, and does not necessarily have to be physically configured as illustrated. That is, a specific form of distribution and integration of individual devices is not limited to the illustrated form, and all or a part thereof can be functionally or physically distributed and integrated in any unit according to various loads, usage conditions, and the like. Furthermore, all or any part of each processing function performed in each device can be realized by a CPU and a program analyzed and executed by the CPU, or can be realized as hardware by wired logic.

Further, among the individual processes described in the embodiment described above, all or some of the processes described as being automatically performed can be manually performed, or all or some of the processes described as being manually performed can be automatically performed by a known method. In addition, the processing procedure, the control procedure, the specific name, and the information including various data and parameters illustrated in the document and the drawings can be freely changed unless otherwise specified.

[Program]

In addition, it is also possible to create a program in which the processing executed by the L2 switch 40 described in the embodiment described above is described in a language that can be executed by a computer. In this case, by the computer executing the program, the effects similar to those of the embodiment described above can be obtained. Further, the program may be recorded in a computer-readable recording medium, and the program recorded in the recording medium may be read and executed by the computer to implement processing similar to the embodiment described above.

Figure 9:
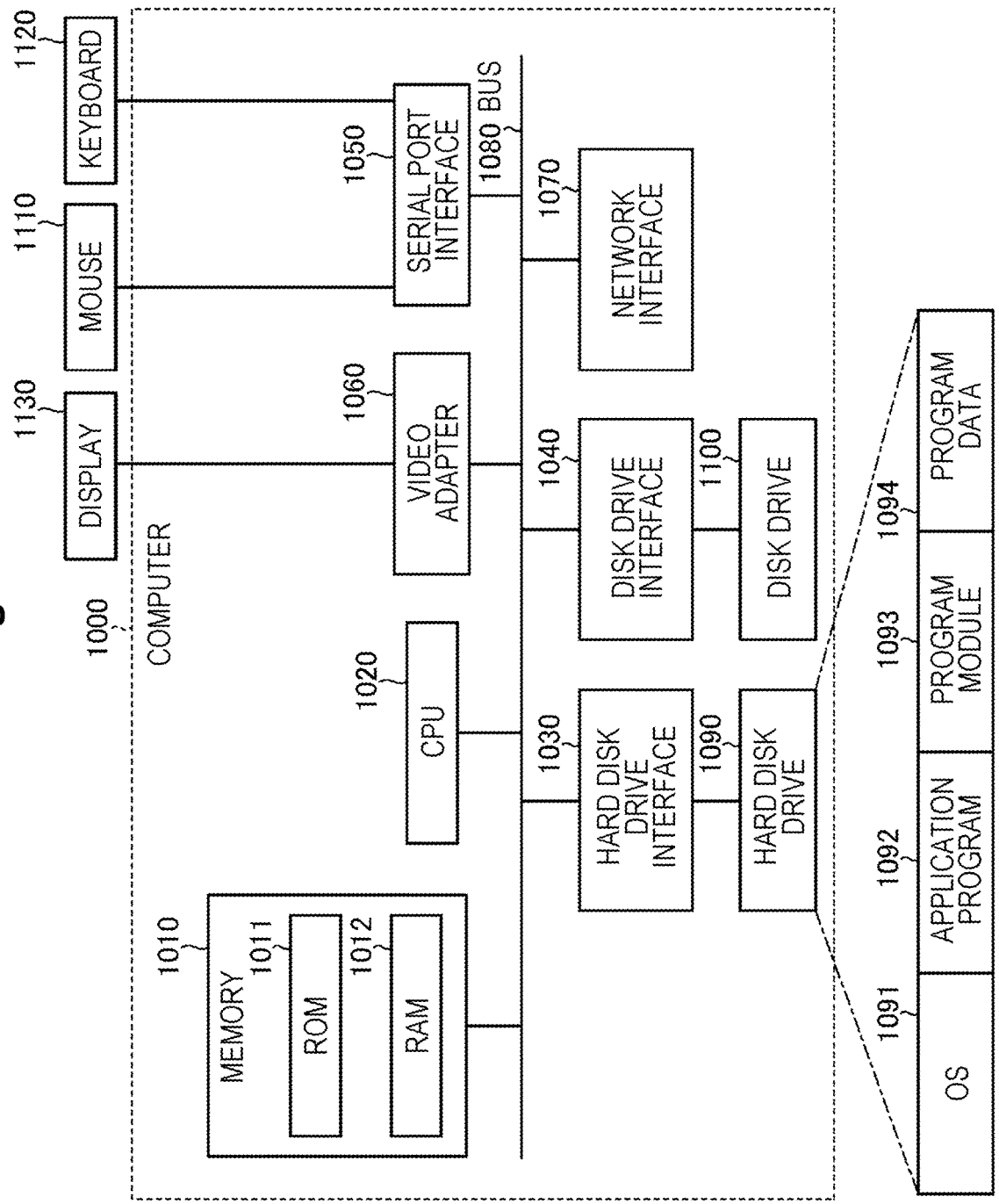
FIG. 9 is a diagram illustrating a computer that executes a program.

FIG. 9 is a diagram illustrating a computer that executes a program. As exemplified in FIG. 9, a computer 1000 includes, for example, a memory 1010, a central processing unit (CPU) 1020, a hard disk drive interface 1030, a disk drive interface 1040, a serial port interface 1050, a video adapter 1060, and a network interface 1070, and these individual units are connected by a bus 1080.

As exemplified in FIG. 9, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as exemplified in FIG. 9. The disk drive interface 1040 is connected to a disk drive 1100 as exemplified in FIG. 9. For example, a removable storage medium such as a magnetic disk or an optical disk is inserted into the disk drive 1100. As exemplified in FIG. 9, the serial port interface 1050 is connected to, for example, a mouse 1110 and a keyboard 1120. As exemplified in FIG. 9, the video adapter 1060 is connected to, for example, a display 1130.

Here, as exemplified in FIG. 9, the hard disk drive 1090 stores, for example, an OS 1091, an application program 1092, a program module 1093, and program data 1094. That is, the above program is stored, for example, in the hard disk drive 1090 as a program module in which a command executed by the computer 1000 is described.

Further, the various data described in the embodiment described above are stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary, and executes various processing procedures.

Note that the program module 1093 and the program data 1094 related to the program are not limited to being stored in the hard disk drive 1090, and may be stored in, for example, a storage medium that is detachably attachable, and read by the CPU 1020 via a disk drive or the like. Alternatively, the program module 1093 and the program data 1094 related to the program may be stored in another computer connected via a network (such as local area network (LAN) or a wide area network (WAN)) and read by the CPU 1020 via the network interface 1070.

The embodiment described above and modifications thereof are included in the invention described in the claims and the equivalent scope thereof similarly to being included in the technology disclosed in the present application.

REFERENCE SIGNS LIST

10 Client
20 L3 switch
30, 30A, 30B NF device
40, 40A, 40B L2 switch
41 Communication unit
42 Input/output unit
43 Control unit
431 Reception unit
432 Allocation unit
433 Compression unit
434 Storing unit
435 Update unit
436 Transmission unit
44 Memory unit
441 Routing information
442 Compression table
443 Session table
50 Server

The invention claimed is:

1. A layer 2 (L2) switch comprising one or more processors configured to:
   receive a first packet of upstream communication that is transmitted from a first network device, acquire session information and destination information included in the first packet, and compress the session information and the destination information;
   store the compressed information into a session table in a memory unit; and
   receive a second packet of downstream communication that is transmitted from a second network device, refer to the session table and use session information included in the second packet to acquire, from the session table in the memory unit, destination information included in the first packet of the upstream communication, and update information specifying a destination of the second packet of the downstream communication to the acquired destination information.

2. The L2 switch according to claim 1, wherein the one or more processors are further configured to:
   determine a storage area for storage of the compressed information, in accordance with a predetermined allocation method; and
   store the compressed information into the storage area.

3. A communication control method comprising:
   receiving a first packet of upstream communication that is transmitted from a first network device, acquiring session information and destination information included in the packet, and compressing the session information and the destination information;
   storing compressed information that has been compressed, into a session table in a memory unit; and
   receiving a second packet of downstream communication that is transmitted from a second network device, referring to the session table and using session information included in the packet to acquire, from the session table in the memory unit, destination information included in the first packet of the upstream communication, and updating information specifying a destination of the second packet of the downstream communication to the acquired destination information.

4. The communication control method according to claim 3, further comprising:
   determining a storage area for storage of the compressed information, in accordance with a predetermined allocation method; and
   storing the compressed information into the storage area.

5. A non-transitory computer readable medium storing one or more instructions causing a computer to execute:
   receiving a first packet of upstream communication that is transmitted from a first network device, acquiring session information and destination information included in the packet, and compressing the session information and the destination information;
   storing compressed information that has been compressed, into a session table in a memory unit; and
   receiving a second packet of downstream communication that is transmitted from a second network device, referring to the session table and using session information included in the packet to acquire, from the session table in the memory unit, destination information included in the first packet of the upstream communication, and updating information specifying a destination of the second packet of the downstream communication to the acquired destination information.

6. The non-transitory computer readable medium according to claim 5, wherein the one or more instructions further cause the computer to execute:
   determining a storage area for storage of the compressed information, in accordance with a predetermined allocation method; and
   storing the compressed information into the storage area.

* * * * *